United States Patent [19]

Sato et al.

[11] Patent Number: 4,641,893
[45] Date of Patent: Feb. 10, 1987

[54] HYDRAULIC BRAKING PRESSURE CONTROL APPARATUS FOR VEHICLES

[75] Inventors: Makoto Sato, Kamifukuoka; Shohei Matsuda, Utsunomiya, Japan

[73] Assignee: Honda Giken Kogyo Kabushiki Kaisha, Tokyo, Japan

[21] Appl. No.: 753,484

[22] Filed: Jul. 10, 1985

[30] Foreign Application Priority Data

Jul. 17, 1984 [JP] Japan ................. 59-148234

[51] Int. Cl.$^4$ ............................................. B60T 8/02
[52] U.S. Cl. ..................................... 303/113; 303/92
[58] Field of Search ................. 188/181 A; 303/6 R, 303/92, 113, 115, 116, 119

[56] References Cited

U.S. PATENT DOCUMENTS 4,215,902 8/1980 Sato et al. .................... 303/113 X
4,417,768 11/1983 Satoh et al. ...................... 303/113

Primary Examiner—Duane A. Reger
Attorney, Agent, or Firm—Armstrong, Nikaido, Marmelstein & Kubovcik

[57] ABSTRACT

Hydraulic braking pressure control apparatus having a casing provided therein with an input hydraulic chamber for receiving a hydraulic pressure from a master cylinder, an output hydraulic chamber adapted to generate a hydraulic pressure to a wheel brake for actuation thereof in response to the input of the pressure to the input hydraulic chamber, and a control chamber to be fed with a control liquid pressure for controlling the pressure output from the output hydraulic chamber in accordance with the condition of a wheel, wherein a valve mechanism is disposed between the input and output hydraulic chambers for cutting their mutual communication only when the liquid pressure is inducted into the control chamber and means is further provided for supplementing pressure oil to the output hydraulic chamber in reply to the reduction of the pressure therein below a set value. The supplementary pressure oil is supplied from the master cyinder through a throttle.

2 Claims, 1 Drawing Figure

U.S. Patent
Feb. 10, 1987
4,641,893
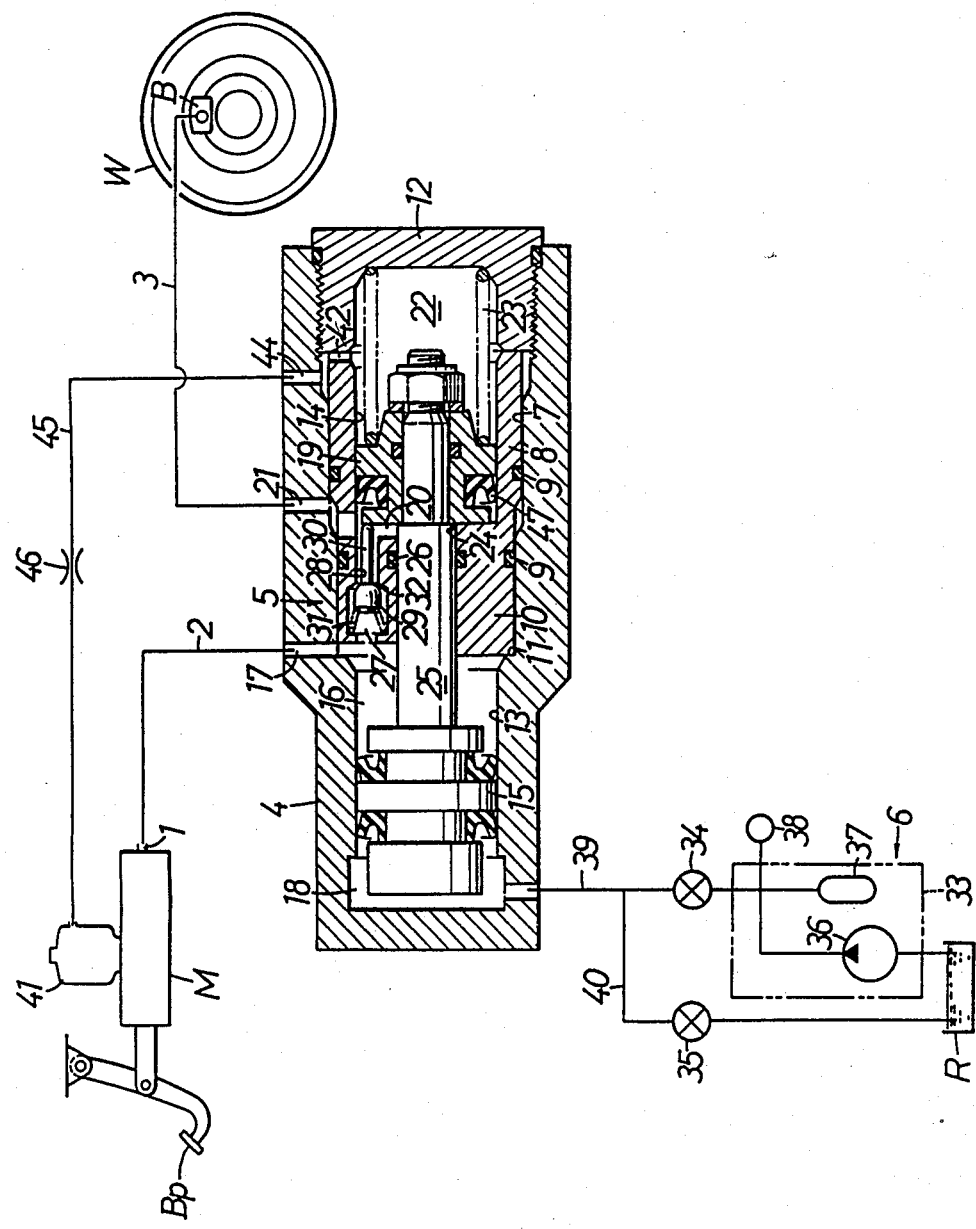

HYDRAULIC BRAKING PRESSURE CONTROL APPARATUS FOR VEHICLES

BACKGROUND OF THE INVENTION

1. Field of the Invention

This invention relates to a hydraulic braking pressure control apparatus for vehicles, and more particularly to an apparatus having an input hydraulic chamber communicating with an output port of a master cylinder, and an output hydraulic chamber communicating with a wheel brake and being adapted to generate a hydraulic braking pressure in accordance with a hydraulic pressure in the input hydraulic chamber, wherein the volume of the output hydraulic chamber can be increased in accordance with the supply of a hydraulic control pressure from an anti-lock control means to a control chamber when a wheel is about to be locked.

2. Description of the Prior Art

In a conventional hydraulic braking pressure control apparatus for vehicles, a piston is operated and moved in response to introduction of a hydraulic pressure into an input hydraulic chamber so as to reduce the volume of an output hydraulic chamber and thereby generate a hydraulic brake pressure from the output hydraulic chamber in accordance with the pressure in the input hydraulic chamber. During an anti-lock control operation, the piston is displaced in a direction opposite to that in the abovementioned case by means of a control liquid pressure supplied to a control chamber, to increase the volume of the output hydraulic chamber.

In the above conventional hydraulic braking pressure control apparatus, a hydraulic braking system is divided into two parts, one of them extending from a master cylinder to an input hydraulic chamber, and the other extending from an output hydraulic chamber to a wheel brake. Accordingly, when supplying a working oil to the hydraulic control system, it is required that those two parts be charged with the oil separately. Moreover, since the piston is in operation at all times during a braking operation, the number of its operation strokes increases to a high level. This may lead to deterioration of the durability of the control apparatus.

The assignee of the present invention has already proposed a hydraulic control apparatus provided with a valve mechanism in a partition which separates an output hydraulic chamber and an input hydraulic chamber from each other, which valve mechanism is adapted to be closed during an anti-lock control operation, so as to integrate the hydraulic braking system into a single line extending from a master cylinder to a wheel brake, thereby facilitating a working oil charging operation and reducing the number of strokes of a piston to improve the durability of the control apparatus.

According to such a hydraulic control apparatus, the above-mentioned problems can be solved. However, when the vehicle runs on a bad road, or when the vehicle is braked excessively due to the trouble of an anti-lock control means, the volume of the output hydraulic chamber increases more than necessary, which may result in that vacuum develops in the hydraulic system between the output hydraulic chamber and wheel brake to cause the generation of trapped air bubbles.

SUMMARY OF THE INVENTION

The present invention has been developed in view of such circumstances. It is an object of the present invention to provide a hydraulic braking pressure control apparatus for vehicles, which is capable of preventing the pressure in the hydraulic system between an output hydraulic chamber and a wheel brake from decreasing to such a low level as causing a problem for practical use.

According to a first aspect of the invention, there is proposed a hydraulic braking pressure control apparatus for vehicles, having an input hydraulic chamber communicating with an output port of a master cylinder, and an output hydraulic chamber communicating with a wheel brake, the output hydraulic chamber being adapted to generate a hydraulic braking pressure, in accordance with a hydraulic pressure inducted into the input hydraulic chamber, the output hydraulic chamber being constructed to be enlarged in volume, when a wheel is about to be locked, in accordance with a hydraulic control pressure supplied from an anti-lock control means to a control chamber. The apparatus comprises a casing in which first and second cylinder portions are provided concentrically with a partition interposed therebetween. A first piston fitted slidably in the first cylinder portion defines the input hydraulic chamber on one side of the piston near the partition and the control chamber on an opposite side thereof far away from the partition. A second piston fitted slidably in the second cylinder portion defines the output hydraulic chamber on one side of the second piston near the partition and a spring chamber on an opposite side thereof far away from the partition. A piston rod penetrating through the partition in an oil-tightly slidable manner and having the first and second pistons mounted fixedly on both end portions thereof. A valve mechanism in the partition is adapted to be closed in accordance with a displacement of the second piston away from the partition. The spring chamber is in communication with a reservoir provided in the master cylinder and houses therein a spring for urging the second piston toward the partition. The sealing structure is provided for sealing between said output hydraulic chamber and said spring chamber but allowing flow of a working oil from the spring chamber to the output hydraulic chamber through the sealing structure.

According to a second aspect of the invention, the hydraulic braking pressure control apparatus is proposed to further include, in addition to the elements provided in the first aspect, a throttle between the spring chamber and the reservoir in the master cylinder.

In the first aspect of the invention, the second piston is displaced toward the partition due to the force of the spring when the anti-lock control means is not in operation, and causes the valve mechanism to be opened. Thus, a hydraulic passage is established extending from the master cylinder to the wheel brake, enabling the hydraulic braking system to be charged with a working oil in one step. The first and second pistons are not operated while the anti-lock control means is not in operation, so that the number of strokes of the pistons decreases. When the output hydraulic chamber has become vacuous, the working oil flows thereinto from the spring chamber. Accordingly, the pressure in the hydraulic system between the output hydraulic chamber and wheel brake does not decrease to a problematical negative level.

In the second aspect of the invention, the interior of the spring chamber is pressurized when the volume thereof is reduced suddenly, to thereby promote the flow of the working oil from the spring chamber to the output hydraulic chamber.

These and other objects, features and advantages of the present invention will become more apparent from the following description of a preferred embodiment thereof to be taken in conjunction with the accompanying drawing.

BRIEF DESCRIPTION OF THE DRAWING

The accompanying drawing is a longitudinal section of an embodiment of the present invention.

DESCRIPTION OF THE PREFERRED EMBODIMENT

An embodiment of the present invention will now be described with reference to the drawing. A casing 4 is interposed between an oil passage 2, which extends from an output port 1 of a master cylinder M, and an oil passage 3, which is connected to a wheel brake B attached to a wheel W. A valve mechanism 5 is provided in the casing 4 and is adapted to transmit a hydraulic braking pressure from the master cylinder M to the wheel brake B during braking operation, and be closed by an anti-lock control liquid pressure, which is supplied from an anti-lock control means 6, when the wheel W is about to be locked, thereby cutting off the supply of hydraulic braking pressure from the master cylinder M to the wheel brake B.

The casing 4 is provided therein with a one-end-opened bore 7, in which a bottomed cylindrical partition member 8 is fitted via O-rings 9, 9 provided between the inner surface of the bore 7 and the outer surface of the partition member 8. The partition member 8 is fitted from its bottom portion, which constitutes a partition 10, into the bore 7 toward the other end thereof until the partition 10 has reached an intermediate portion of the bore 7, where the partition member 8 is supported on a stepped portion 11 provided at the intermediate portion of the bore 7 so as to face the open end thereof. A cap 12 is screwed to the open end portion of the bore 7. This cap 12 is tightened while being in abutment against the open end of the partition member 8 to such an extent that the partition member 8 is pressed against the stepped portion 11. Thus, within the casing 4 are defined concentrically a first cylinder portion 13 and a second cylinder portion 14 via the partition 10, the latter portion 14 being within the partition member 8.

A first piston 15 is fitted slidably in the first cylinder portion 13. An input hydraulic chamber 16 is formed between the first piston 15 and partition 10, and communicates with the oil passage 2 via an inlet passage 17 which is provided in a side wall of the casing 4. On the opposite side of the first piston 15 with respect to this input hydraulic chamber 16, a control chamber 18 is formed by the first piston 15 and an end wall of the first cylinder portion 13.

A second piston 19, the diameter of which is equal to that of the first piston 15, is fitted slidably in the second cylinder portion 14. Between this second piston 19 and the partition 10, an output hydraulic chamber 20 is defined to communicate with the oil passage 3 via an outlet oil passage 21 which is formed so as to extend through the side wall of the casing 4. Between the second piston 19 and the cap 12 is a spring chamber 22 formed for housing therein a spring 23 urging the second piston 19 toward the partition 10.

A piston rod 25 is inserted through a through bore 24, which is provided in the central portion of the partition 10, in such a manner that the piston rod 25 can be axially moved therethrough. The first and second pistons 15, 19 are mounted rigidly on both end portions of this piston rod 25. An O-ring 26 which slidingly contacts the outer circumferential surface of the piston rod 25 is fitted in the inner surface of the through bore 24, so that the input and output hydraulic chambers 16, 20 are prevented from communicating with each other via a clearance between the outer surface of the piston rod 25 and the inner surface of the through bore 24.

The partition 10 is provided therein with the valve mechanism 5. This mechanism 5 comprises a valve chamber 27 formed in the partition 10 and connected with the input hydraulic chamber 16, a valve port 28 formed so as to extend between the valve chamber 27 and the output hydraulic chamber 20, a spherical valve body 29 housed in the valve chamber 27 for opening and closing the valve port 28, a driving rod 30 formed integrally with the valve body 29 and extending through the valve port 28 so as to project into the output hydraulic chamber 20, and a spring 31 housed in the valve chamber 27 and urging the valve body 29 toward the valve port 28. The end surface of the valve chamber 27 which is on the side of the valve port 28 is provided with a conical valve seat 32 converging toward the valve port 28. The driving rod 30 is designed to be long enough to be pressed by the second piston 19, when the piston 19 is displaced toward the partition 10 by a maximum amount, to allow the valve body 29 to move apart from the valve seat 32.

The anti-lock control means 6 comprises a liquid pressure source 33, a normally-closed first electromagnetic valve 34, and a normally-open second electromagnetic valve 35. The liquid pressure source 33 consists of a hydraulic pump 36 for drawing up a control liquid, for example, pressure oil from an oil tank R, an accumulator 37, and a hydraulic sensor 38 for detecting troubles and any loss of the hydraulic pressure in the hydraulic pump 36 and the starting and stopping of operation of the pump 36.

The first electromagnetic valve 34 is disposed at an intermediate portion of an oil supply passage 39 which connects between the liquid pressure source 33 and control chamber 18, whereas the second electromagnetic valve 35 is disposed at an intermediate portion of a return oil passage 40 which branches from that portion of the oil supply passage 39 which is between the first electromagnetic valve 34 and control chamber 18, to lead to the oil tank R.

The first electromagnetic valve 34 is normally closed, and the second electromagnetic valve 35 normally opened. When a sensor (not shown) detects that the wheel W is about to be locked, the second electromagnetic valve 35 is closed, and the first electromagnetic valve 34 opened. Accordingly, the control chamber 18 is normally communicated with the oil tank R. When the wheel W is about to be locked, an anti-lock control liquid pressure from the liquid pressure source 33 is supplied to the control chamber 18.

According to the present invention, the spring chamber 22 is communicated with a reservoir 41 in the master cylinder M. A groove is formed in the open end surface of the partition member 8, and this groove forms an oil passage 42 when the cap 12 is in abutment against the same open end surface. The casing 4 is further provided with an oil passage 44 communicating with the oil passage 42 and also with the reservoir 41 via an oil passage 45. A throttle 46 is provided in an intermediate portion of the oil passage 45. A sealing structure for sealing between the output hydraulic chamber 20 and the spring chamber 22 is arranged so as to permit the working oil to flow from the spring chamber 22 to the output hydraulic chamber 20. That is, a seal member 47, which slidingly contacts the inner surface of the second cylinder portion 14, is attached to that end surface of the second piston 19 which faces the output hydraulic chamber 20. This seal member 47 is formed so as to permit the working oil to flow from the spring chamber 22 to the input hydraulic chamber 20.

The operation of this embodiment will now be described. While the braking pressure control apparatus is not in operation, in which a brake pedal Bp is not depressed, the second piston 19 is displaced to left by the resilient force of the spring 23 to the extent that the piston 19 contacts the partition 10. In the valve mechanism 5, the driving rod 30 is pressed by the second piston 19, and the valve body 29 is apart from the valve seat 32 and is open. Accordingly, a hydraulic passage extending from the output port 1 of the master cylinder M to the wheel brake B via the oil passage 2, inlet oil passage 17, input hydraulic chamber 16, valve chamber 27, valve port 28, output hydraulic chamber 20, outlet oil passage 21 and oil passage 3 is formed. This enables the hydraulic braking system to be charged with a working oil very easily in the same way as in a hydraulic braking system which is not provided with such valve mechanism 5 for an anti-lock control operation. In a conventional hydraulic braking pressure control apparatus, it is necessary that the working oil charging operation be carried out separately for the hydraulic passage which extends from the master cylinder M to the input hydraulic chamber 16, and the hydraulic passage extending from the output hydraulic chamber 20 to the wheel brake B. According to the present invention, the hydraulic braking pressure passage extending from the master cylinder M to the wheel brake B is established, and, therefore, the hydraulic braking pressure passage from the master cylinder M to the wheel brake B can be charged with working oil completely by simply feeding a working oil into the master cylinder M.

When a braking operation is carried out by depressing the brake pedal Bp, the hydraulic braking pressure is supplied from the output port 1 of the master cylinder M to the wheel brake B via the above-mentioned hydraulic passage. During this time, a control liquid pressure from the anti-lock control means 6 is not supplied to the control chamber 18, so that the second piston 19 remains in the position in which it has been displaced the maximum stroke toward the partition 10 due to the resilient force of the spring 23, with the valve mechanism 5 left open. Since the hydraulic braking pressure is thus supplied directly from the master cylinder M to the wheel brake B, a stroke switch for the piston, which is provided in a conventional hydraulic braking pressure control apparatus for the purpose of detecting the leakage of the hydraulic braking pressure, can be omitted, and the leakage of hydraulic pressure can be detected by a means which is normally used in a hydraulic braking system having no anti-lock controlling function.

When the braking force has become too large during braking operation and the wheel W is about to be locked, the second electromagnetic valve 35 is closed and the first electromagnetic valve 34 is opened. Consequently, the anti-lock control liquid pressure is supplied from the liquid pressure source 33 to the control chamber 18, and the first piston 15 is forced to right against the leftward biasing force of the spring 23 and the hydraulic pressure in the input hydraulic chamber 16. At the same time, the second piston 19 moves apart from the partition 10 to cause the valve body 29 of the valve mechanism 5 to engage the valve seat 32. As a result, the valve mechanism 5 is closed, and the supply of the hydraulic braking pressure to the wheel brake B is cut off. This can prevent the wheel W from being locked. If the wheel is still likely to become locked, the control liquid pressure in the control chamber 18 further increases, and the first piston 15 further moves rightward. As a result, the volume of the output hydraulic chamber 20 becomes large, and the hydraulic braking pressure applied to the wheel brake B decreases. In consequence, the locking of the wheel W can be prevented reliably.

Assume that the anti-lock control means 6 has gone out of order to cause the control liquid pressure in the control chamber 18 to increase abnormally to a degree exceeding the level at which wheel lock is efficiently prevented. Then, the piston rod 25 is displaced further to the right while compressing the spring 23. Consequently, the volume of the output hydraulic chamber 20 increases abnormally. When the pressure in the output hydraulic chamber 20 has then become excessively negative to exceeding the wheel lock preventing level, the seal member 47 permits the working oil to flow from the spring chamber 22 to the output hydraulic chamber 20, so that the pressure in the hydraulic system extending from the output hydraulic chamber 20 to the wheel brake B does not decrease to such a negative level as causing a problem. Moreover, since the throttle 46 is provided in the intermediate portion of the oil passage 45, the hydraulic pressure in the spring chamber 22 increases when the piston rod 25 is moved to the right abruptly, thereby to enable the working oil to be supplied reliably from the spring chamber 22 to the output hydraulic chamber 20. Accordingly, the pressure in the output hydraulic chamber 20 can be prevented reliably from decreasing to a practically problematical negative level.

As described above, according to the first aspect of the invention, a casing is provided to have first and second cylinder portions formed therein concentrically via a partition, a first piston being fitted slidably in the first cylinder portion so as to define the input hydraulic chamber on the side of the partition and the control chamber on the side away from the partition while a second piston being fitted slidably in the second cylinder portion so as to define the output hydraulic chamber on the side of the partition and a spring chamber on the side away from the partition, a piston rod penetrating through the partition in an oil-tightly slidable manner and having the first and second pistons mounted rigidly on both end portions thereof, a valve mechanism being provided in the partition and adapted to be closed in accordance with the displacement of the second piston away from the partition, and a spring being housed in the spring chamber for urging the second piston toward the partition. Therefore, when the anti-lock control means is not in operation, the second piston takes a position displaced to the maximum extent toward the partition to keep the valve mechanism open, whereby a hydraulic passage extending from the master cylinder to the wheel brake is established. Therefore, the charging of working oil into the hydraulic control system can be done through one step. The first and second pistons are not operated when the anti-lock control means is not in operation, and the pistons are movable by a necessary amount only when the control means is in operation. This enables the number of strokes of the pistons to decrease, and the durability of the apparatus to be improved.

The spring chamber is communicated with the reservoir in the master cylinder, and the seal means provided between the output hydraulic chamber and the spring chamber is formed so as to permit the working oil to flow from the spring chamber to the output hydraulic chamber. Accordingly, even when the control liquid pressure in the control chamber has increased abnormally, the pressure in the hydraulic system extending between the output hydraulic chamber and wheel brake can be prevented from decreasing to a practically problematical negative level.

The second aspect of the invention provides, in addition to the elements provided according to the first aspect, a throttle between the spring chamber and the reservoir in the master cylinder. Therefore, further advantages are obtained in addition to those mentioned above such that the supply of the working oil from the spring chamber to the output hydraulic chamber is promoted, and the pressure in the hydraulic system extending between the output hydraulic chamber and wheel brake can be prevented reliably from decreasing to a practically problematical negative level.

What is claimed is:

1. A hydraulic braking pressure control apparatus for vehicles, having an input hydraulic chamber communicating with an output port of a master cylinder, and an output hydraulic chamber communicating with a wheel brake, said output hydraulic chamber being adapted to generate a hydraulic braking pressure in accordance with a hydraulic pressure inducted into said input hydraulic chamber, said output hydraulic chamber being constructed to be enlarged in volume, when a wheel is about to be locked, in accordance with a hydraulic control pressure supplied from an anti-lock control means to a control chamber, said apparatus comprising a casing in which first and second cylinder portions are provided concentrically with a partition interposed therebetween; a first piston fitted slidably in said first cylinder portion to define said input hydraulic chamber on one side of the piston near said partition and said control chamber on an opposite side thereof far away from said partition; a second piston fitted slidably in said second cylinder portion to define said output hydraulic chamber on one side of said second piston near said partition and a spring chamber on an opposite side thereof far away from said partition; a piston rod penetrating through said partition in an oil-tightly slidable manner and having said first and second pistons mounted fixedly on both end portions thereof; a valve mechanism provided in said partition and adapted to be closed in accordance with a displacement of said second piston away from said partition; wherein said spring chamber is in communication with a reservoir provided in said master cylinder and houses therein a spring for urging said second piston toward said partition and wherein a sealing structure is provided for sealing between said output hydraulic chamber and said spring chamber but allowing flow of a working oil from said spring chamber to said output hydraulic chamber through said sealing structure.

2. A hydraulic braking pressure control apparatus for vehicles, having an input hydraulic chamber communicating with an output port of a master cylinder, and an output hydraulic chamber communicating with a wheel brake, said output hydraulic chamber being adapted to generate a hydraulic braking pressure in accordance with a hydraulic pressure inducted into said input hydraulic chamber, said output hydraulic chamber being constructed to be enlarged in volume, when a wheel is about to be locked, in accordance with a hydraulic control pressure supplied from an anti-lock control means to a control chamber said apparatus comprising a casing in which first and second cylinder portions are provided concentrically with a partition interposed therebetween; a first piston fitted slidably in said first cylinder portion to define said input hydraulic chamber on one side of the piston near said partition and said control chamber on an opposite side thereof far away from said partition; a second piston fitted slidably in said second cylinder portion to define said output hydraulic chamber on one side of said second piston near said partition and a spring chamber on an opposite side thereof far away from said partition; a piston rod penetrating through said partition in an oil-tightly slidable manner and having said first and second pistons mounted fixedly on both end portions thereof; a valve mechanism provided in said partition and adapted to be closed in accordance with a displacement of said second piston away from said partition; wherein said spring chamber is in communication with a reservoir provided in said master cylinder via a throttle and houses therein a spring for urging said second piston toward said partition and wherein a sealing structure is provided for sealing between said output hydraulic chamber and said spring chamber but allowing flow of a working oil from said spring chamber to said output hydraulic chamber through said sealing structure.

* * * * *